United States Patent
Rumpf

(10) Patent No.: US 7,830,108 B2
(45) Date of Patent: Nov. 9, 2010

(54) DEVICE FOR SUPPLYING ELECTRICAL POWER TO A FUEL PUMP OF A MOTOR VEHICLE INTERNAL COMBUSTION ENGINE

(75) Inventor: Bernd Rumpf, Nidderau-Windecken (DE)

(73) Assignee: Siemens Aktiengesellschaft, München (DE)

( * ) Notice: Subject to any disclaimer, the term of this patent is extended or adjusted under 35 U.S.C. 154(b) by 482 days.

(21) Appl. No.: 11/632,620

(22) PCT Filed: Jul. 26, 2005

(86) PCT No.: PCT/EP2005/053639

§ 371 (c)(1),
(2), (4) Date: Jan. 16, 2007

(87) PCT Pub. No.: WO2006/013175

PCT Pub. Date: Feb. 9, 2006

(65) Prior Publication Data

US 2008/0273353 A1 Nov. 6, 2008

(30) Foreign Application Priority Data

Jul. 29, 2004 (DE) ........................ 10 2004 036 814

(51) Int. Cl.
*F02D 1/00* (2006.01)
(52) U.S. Cl. ............................ 318/479; 363/59; 363/74; 123/497
(58) Field of Classification Search .................. 318/478, 318/479, 504; 363/59, 74, 78, 123; 123/495, 123/497
See application file for complete search history.

(56) References Cited

U.S. PATENT DOCUMENTS

| | | | | |
|---|---|---|---|---|
| 4,509,363 A * | 4/1985 | Takahashi | ................. | 73/114.41 |
| 4,553,196 A | 11/1985 | Tokuyama et al. | | |
| 4,565,173 A * | 1/1986 | Oshiage et al. | ............. | 123/458 |
| 4,723,105 A * | 2/1988 | Matouka et al. | ............. | 320/123 |
| 4,791,905 A * | 12/1988 | Furuta et al. | ................. | 123/497 |
| 5,092,302 A * | 3/1992 | Mohan | ........................ | 123/497 |
| 5,672,051 A * | 9/1997 | Forgue et al. | ............. | 417/44.11 |
| 5,982,604 A | 11/1999 | Kojima et al. | | |
| 6,323,608 B1 * | 11/2001 | Ozawa | ........................ | 318/139 |
| 6,630,810 B2 * | 10/2003 | Takemasa et al. | ........... | 320/104 |
| 2003/0117019 A1 * | 6/2003 | Furukawa et al. | .......... | 307/10.6 |
| 2005/0275310 A1 * | 12/2005 | Ripoll | ........................ | 310/317 |

(Continued)

FOREIGN PATENT DOCUMENTS

DE 10 2004 002 105 B3 6/2005

(Continued)

*Primary Examiner*—Bentsu Ro
(74) *Attorney, Agent, or Firm*—Cohen Pontani Lieberman & Pavane LLP

(57) ABSTRACT

A device (1) for supplying electric current to the fuel pump (2) of a motor vehicle internal combustion engine (3) comprises a DC/DC converter (13) which increases voltage to a predetermined value in the event of a voltage drop of a direct current source (7). This ensures an adequate voltage supply of the fuel pump (2) even at low voltages of the direct voltage source. When the voltage (15) of the direct voltage source (7) is sufficient, the DC/DC converter (13) is bridged, so that the fuel pump (2) is directly supplied with fuel from the direct voltage source (7). The DC/DC converter is also bridged when the device is faulty.

14 Claims, 1 Drawing Sheet

U.S. PATENT DOCUMENTS

2008/0224537 A1 * 9/2008 Uhl .......................... 307/10.1

FOREIGN PATENT DOCUMENTS

| EP | 0 081 593 A1 | 6/1983 |
| JP | 57-206231 | 12/1982 |
| JP | 02051334 A | 2/1990 |
| JP | 7-17660 | 3/1995 |
| JP | 10026030 | 1/1998 |
| JP | 10271672 | 10/1998 |

* cited by examiner

DEVICE FOR SUPPLYING ELECTRICAL POWER TO A FUEL PUMP OF A MOTOR VEHICLE INTERNAL COMBUSTION ENGINE

BACKGROUND OF THE INVENTION

The invention relates to a device for supplying electrical power to a fuel pump of a motor vehicle internal combustion engine, having a first terminal to be connected to a DC voltage source, and having a second terminal to be connected to the fuel pump.

Such devices connect the fuel pump to the DC voltage source when the internal combustion engine is started. The DC voltage source in today's motor vehicles is a battery, which is charged while the internal combustion engine is running. In this case, the fuel pump is designed for the voltage from the DC voltage source of 12 Volts, for example, and supplies the internal combustion engine with fuel. After starting, the fuel pump is normally supplied with a substantially constant voltage via an alternator driven by the internal combustion engine. The voltage from the DC voltage source, however, depends on the temperature, its age, service condition and other factors. In particular at low temperatures, the voltage from the DC voltage source drops severely, for example to 7 Volts. Thus at low temperatures, a reliable supply of fuel to the internal combustion engine is no longer guaranteed. In order to satisfy exhaust standards, today's engine management systems require defined pressures and delivery rates from the fuel pump as soon as the internal combustion engine is started.

One could have the idea to provide a plurality of fuel pumps designed for different voltages, and to drive a fuel pump designed for 7 Volts when there is a voltage of 7 Volts from the DC voltage source. At a voltage of 12 Volts, the system then switches to an internal combustion engine designed for 12 Volts. This, however, requires a very complex design and is thus extremely costly.

BRIEF DESCRIPTION OF THE INVENTION

The object of the invention is to design a device of the type cited in the introduction in such a way that the fuel pump enables a reliable supply of fuel to the internal combustion engine even at low temperatures and low voltages.

This object is achieved according to the invention by a DC/DC converter designed to increase the DC voltage from the DC voltage source being arranged between the terminals.

By means of this design, too low a voltage from the DC voltage source is increased by the DC/DC converter. Thus, when the voltage from the DC voltage source is too low, it is ensured that a sufficient voltage is applied to the second terminal leading to the fuel pump. The internal combustion engine is thereby reliably supplied with fuel even at very low temperatures. Since the internal combustion engine can be supplied by means of a single fuel pump designed for a single designated voltage, the device according to the invention results in a particularly cost-effective supply of fuel to the internal combustion engine.

According to an advantageous development of the invention, it is straightforward to detect too low a voltage from the DC voltage source if a monitoring device for monitoring the voltage from the DC voltage source is connected to the first terminal. Using values from the monitoring device, it is thus straightforward to decide whether the DC/DC converter needs to be activated.

According to another advantageous development of the invention, it is straightforward to guarantee particularly reliable detection of the voltage from the DC voltage source if the monitoring device comprises a voltage detector having a watchdog circuit for checking that the voltage detector is working.

According to another advantageous development of the invention, when there is sufficient voltage from the DC voltage source, it is straightforward to avoid unnecessary operation of the DC/DC converter if the DC/DC converter is connected in parallel with a bypass link connecting the two terminals directly together, and if a changeover switch is provided for selective activation of the DC/DC converter or the bypass link.

The device according to the invention has a particularly simple mechanical design if the changeover switch is arranged at the first terminal and connected to the bypass link and the DC/DC converter.

According to another advantageous development of the invention, it is straightforward to avoid manual intervention in the device according to the invention if the changeover switch can be controlled by the monitoring device.

According to another advantageous development of the invention, controlling the changeover switch as a function of the voltage from the DC voltage source requires a design of particularly low complexity if control of the changeover switch by means of the monitoring device comprises a transistor circuit or a relay.

According to another advantageous development of the invention, it helps to further simplify control of the changeover switch if the monitoring device comprises a signaling device to produce an electrical signal, and if the electrical signal is no longer produced above a designated voltage of the DC voltage source. The changeover switch thereby receives a clear signal, the DC/DC converter being activated or not activated by the changeover switch when this signal is present.

According to another advantageous development of the invention, it is straightforward to avoid unnecessary operation of the DC/DC converter when the monitoring device is faulty if the changeover switch is designed to activate the bypass link when in its normal position. The required rate of cooling of the DC/DC converter can also be kept particularly low by avoiding unnecessary operation of the DC/DC converter.

Normally after the motor vehicle internal combustion engine has started there is sufficient voltage available to supply the fuel pump. In this case, operation of the DC/DC converter is no longer required and should stop to avoid damage to the fuel pump. According to another advantageous development of the invention, it is straightforward to deactivate the DC/DC converter after the internal combustion engine has started if the monitoring device has a timer circuit, and if the timer circuit activates the bypass link above a designated time period after activation of the DC/DC converter. The timer circuit thus ensures that, irrespective of the voltage detected by the monitoring device, the DC/DC converter is deactivated and the two terminals are connected together by the bypass link after the time period has elapsed. The changeover switch is preferably used to deactivate the DC/DC converter and to activate the bypass link.

According to another advantageous embodiment of the invention, it is straightforward to ensure necessary activation of the DC/DC converter until the internal combustion engine has started if the designated time period of the timer circuit equals 20 to 180 seconds. If the internal combustion engine does not start after the time period has elapsed, and hence nor does it supply a sufficient voltage for the fuel pump, this indicates that there is a fault in the internal combustion engine. The time period of 20 to 180 seconds of the timer circuit ensures that damage to the DC/DC converter is prevented in the event of such a fault. The time period preferably equals 60 seconds. The timer circuit overrides all other programs of the device. Once the time period has elapsed, the fuel pump is supplied with electrical power directly from the DC voltage source.

BRIEF DESCRIPTION OF THE DRAWINGS

The invention affords numerous embodiments. To explain the fundamental principle of the invention further, one of these embodiments is shown in the drawing and described below, in which.

DETAILED DESCRIPTION OF THE INVENTION

Figure 1:
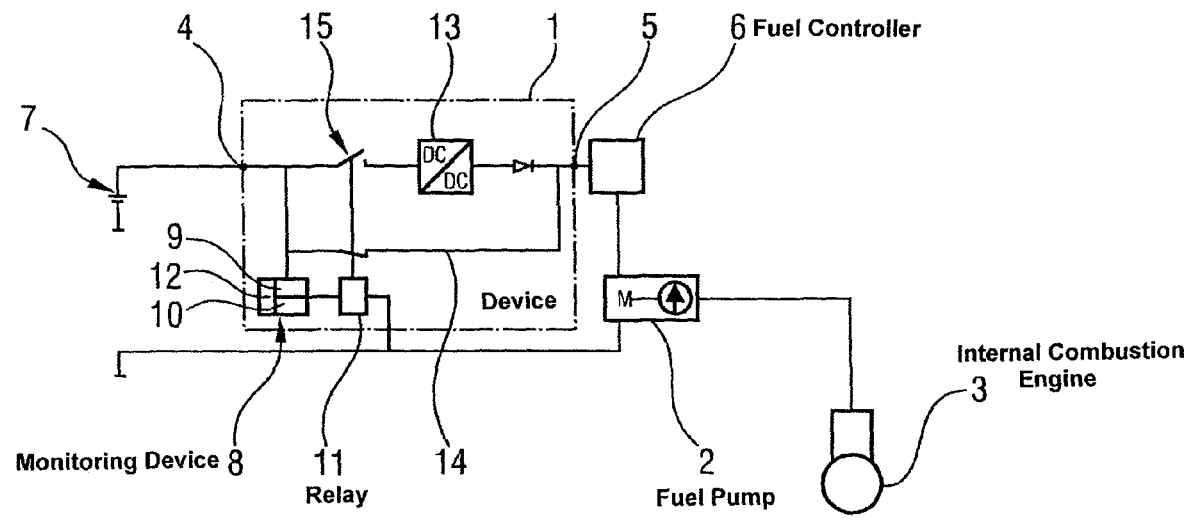
FIG. 1 shows a circuit diagram of the device according to the invention when there is sufficient voltage from a DC voltage source.
Figure 2:
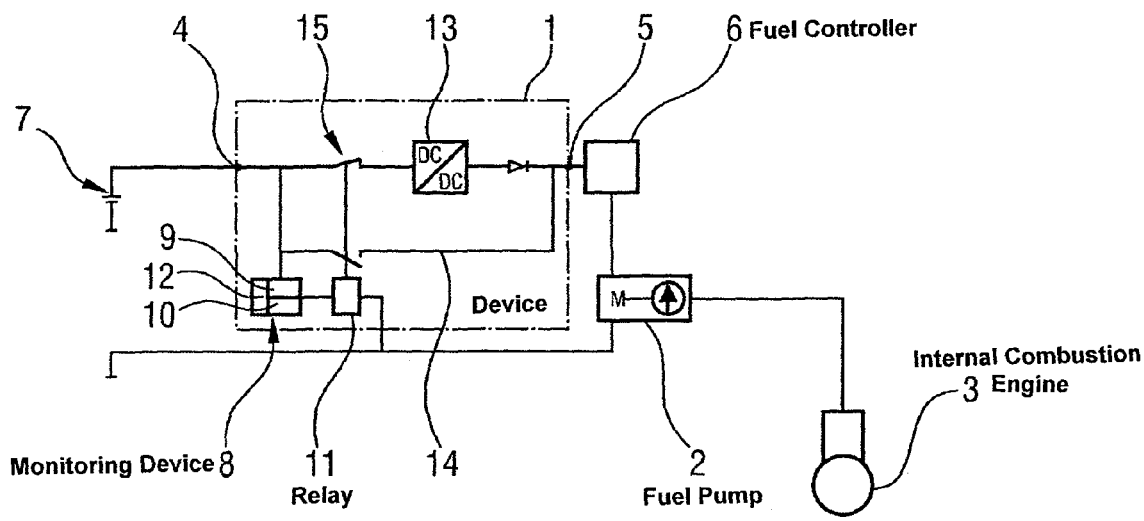
FIG. 2 shows the circuit diagram of FIG. 1 when the voltage from the DC voltage source is too low.

FIGS. 1 and 2 show a device 1 for supplying electrical power to a fuel pump 2 of a motor vehicle internal combustion engine 3. The device 1 comprises a first terminal 4 connected to a DC voltage source, and a second terminal 5 connected to a fuel controller 6 of the fuel pump 2. The fuel controller 6 is optional and can be omitted in an alternative embodiment. The fuel controller 6 connects the second terminal 5 of the device 1 to the fuel pump 2 when the internal combustion engine 3 is to be started and while the internal combustion engine 3 is running. The first terminal 4 of the device 1 is connected to a DC voltage source 7 implemented as a motor vehicle battery. A monitoring device 8 monitors a threshold voltage of the DC voltage source 7. The monitoring device 8 comprises a voltage detector 9 connected to the first terminal 4, and a watchdog circuit 10, and is connected to a relay 11. In addition, the monitoring device 8 is connected to a timer circuit 12.

The device 1 comprises a DC/DC converter 13, which converts a low DC voltage below the threshold voltage of 8 or 9 Volts, for instance, at the first terminal 4 into a designated larger operating voltage of 12 Volts, for example, at the second terminal 5. The DC/DC converter 13 is connected in parallel with a bypass link 14 that connects directly together the two terminals 4, 5 of the device 1. A changeover switch 15 selectively connects the bypass link 14 or the DC/DC converter 13 to the first terminal 4. The changeover switch 15 is switched by the relay 11.

If the voltage from the DC voltage source 7 drops below the threshold voltage, the voltage is detected by the monitoring device 8, and the relay 11 is energized so that the DC/DC converter 13 connects the two terminals 4, 5 of the device 1. At the same time, the connection of the bypass link 14 to the first terminal 4 is broken by the changeover switch 15, so that the fuel pump 2 is solely supplied with electrical power via the DC/DC converter 13. Since the DC/DC converter 13 increases the DC voltage from below the threshold voltage, e.g. 7 Volts, to the operating voltage, e.g. 12 Volts, the fuel pump 2 is supplied with electrical power from a voltage of 12 Volts. This enables the fuel pump 2 to have a sufficient delivery rate so that the internal combustion engine 3 is supplied with the sufficient quantity of fuel. This position of the changeover switch 15 is shown in FIG. 2.

If the monitoring device 8 detects a voltage above the threshold voltage, the relay 11 is no longer energized, whereby the terminals 4, 5 of the device 1 are connected together by the bypass link 14. This is the normal state of the device 1, which is shown in FIG. 1. Likewise, the relay 11 is no longer energized in the event of a fault in the voltage detector 9 or a designated time period after the fuel pump 2 has started, this time period being programmed in the timer circuit 12, so that also in these cases the fuel pump 2 is supplied via the bypass link 14.

Instead of the relay 11 and the mechanical changeover switch 15 shown, a transistor circuit can also be provided that selectively connects the DC/DC converter 13 or the bypass link 14 to the first terminal 4.

The invention claimed is:

1. A device for supplying electrical power to a fuel pump of a motor vehicle internal combustion engine, comprising:
    a first terminal for connection to a DC voltage source;
    a second terminal for connection to the fuel pump;
    a fuel controller connected to the second terminal which is configured to connect the second terminal to the fuel pump when the motor vehicle internal combustion engine is to be started and while the motor vehicle internal combustion engine is running;
    a DC/DC converter which increases DC voltage from the DC voltage source connected directly to the first terminal and arranged between the first and second terminals; and
    a monitoring device for monitoring the DC voltage from the DC voltage source connected to the first terminal, said monitoring device comprising a signaling device configured to produce an electrical signal which is not produced above a designated voltage of the DC voltage source.

2. The device as claimed in claim 1, wherein the monitoring device further comprises a voltage detector having a watchdog circuit for checking that the voltage detector is working.

3. The device as claimed in claim 1, wherein the DC/DC converter is connected in parallel with a bypass link which directly connects the first and second terminals together, and wherein a changeover switch is provided for selectively activating the DC/DC converter or the bypass link.

4. The device as claimed in claim 3, wherein the changeover switch is arranged at the first terminal and connected to the bypass link and the DC/DC converter.

5. The device as claimed in claim 4, wherein the changeover switch is controllable by the monitoring device.

6. The device as claimed in claim 3, wherein the changeover switch is controllable by the monitoring device.

7. The device as claimed in claim 3, wherein the monitoring device further comprises a transistor circuit or a relay for controlling the changeover switch.

8. The device as claimed in claim 3, wherein the changeover switch is configured to activate the bypass link when in its normal position.

9. The device as claimed in claim 3, wherein the monitoring device includes a timer circuit which activates the bypass link above a designated time period after activation of the DC/DC converter.

10. The device as claimed in claim 9, wherein the designated time period of the timer circuit equals 20 to 180 seconds.

11. The device as claimed in claim 1, wherein the DC/DC converter converts a low DC voltage below the threshold voltage at the first terminal into a designated larger operating voltage at the second terminal.

12. A device for supplying electrical power to a fuel pump of a motor vehicle internal combustion engine, comprising:
- a first terminal connectable to a DC voltage source;
- a second terminal for connection to the fuel pump;
- a DC/DC converter which increases DC voltage from the DC voltage source arranged between the first and second terminals;
- a bypass link connected in parallel with the DC/DC converter, the bypass link directly connecting the first and second terminals together;
- a changeover switch which selectively activates the DC/DC converter or the bypass link; and
- a monitoring device having a timer circuit which activates the bypass link above a designated time period after activation of the DC/DC converter.

13. The device as claimed in claim 12, wherein the DC/DC converter converts a low DC voltage below the threshold voltage at the first terminal into a designated larger operating voltage at the second terminal.

14. A device for supplying electrical power to a fuel pump of a motor vehicle internal combustion engine, comprising:
- a first terminal for connection to a DC voltage source;
- a second terminal for connection to the fuel pump;
- a fuel controller connected to the second terminal which is configured to connect the second terminal to the fuel pump when the motor vehicle internal combustion engine is to be started and while the motor vehicle internal combustion engine is running;
- a DC/DC converter which increases DC voltage from the DC voltage source connected directly to the first terminal and arranged between the first and second terminals, the DC/DC converter being connected in parallel with a bypass link which directly connects the first and second terminals together;
- a changeover switch for selectively activating one of the DC/DC converter and the bypass link; and
- a monitoring device having a timer circuit which activates the bypass link above a designated time period after activation of the DC/DC converter.

* * * * *